(12) United States Patent
Schubert

(10) Patent No.: US 8,111,049 B2
(45) Date of Patent: Feb. 7, 2012

(54) POWER SUPPLY DEVICE FOR AN ELECTRIC CIRCUIT

(75) Inventor: Goeran Schubert, Schwabach (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 489 days.

(21) Appl. No.: 12/311,759

(22) PCT Filed: Oct. 17, 2007

(86) PCT No.: PCT/DE2007/001849
§ 371 (c)(1),
(2), (4) Date: Apr. 9, 2009

(87) PCT Pub. No.: WO2008/052509
PCT Pub. Date: May 8, 2008

(65) Prior Publication Data
US 2009/0257252 A1    Oct. 15, 2009

(30) Foreign Application Priority Data
Nov. 3, 2006    (DE) .......................... 10 2006 051 845

(51) Int. Cl.
*G05F 1/70*    (2006.01)
*G05F 5/00*    (2006.01)
(52) U.S. Cl. .......... 323/206; 323/247; 323/301; 307/105
(58) Field of Classification Search .......... 323/205–209, 323/247, 248, 299–303; 307/105; 331/167, 331/181
See application file for complete search history.

(56) References Cited

U.S. PATENT DOCUMENTS

| 3,859,542 | A | * | 1/1975 | Kennedy | 307/401 |
| 4,812,669 | A | * | 3/1989 | Takeda et al. | 307/105 |
| 4,939,486 | A | | 7/1990 | Bergdahl et al. | |
| 5,465,203 | A | * | 11/1995 | Bhattacharya et al. | 363/40 |
| 5,526,252 | A | * | 6/1996 | Erdman | 363/41 |
| 6,107,784 | A | * | 8/2000 | Nomiya et al. | 323/205 |
| 6,208,537 | B1 | | 3/2001 | Skibinski et al. | |
| 2001/0033212 | A1 | | 10/2001 | Ohira et al. | |

FOREIGN PATENT DOCUMENTS

| EP | 1 253 694 | 10/2002 |
| JP | 01-293005 | 11/1989 |
| JP | 08-098539 | 4/1996 |
| JP | 08-126201 | 5/1996 |
| SU | 607 314 | 5/1978 |

OTHER PUBLICATIONS

International Preliminary Report on Patentability for Application No. PCT/DE2007/001849, dated May 5, 2009, 6 pages, International Bureau of WIPO, Geneva, Switzerland.

* cited by examiner

*Primary Examiner* — Jessica Han
(74) *Attorney, Agent, or Firm* — W. F. Fasse; W. G. Fasse

(57) ABSTRACT

In the case of a power supply device (2) for an electric circuit (3), an energy source (4) and an electric filter (7) are provided for the reliable and low-emission supply of energy to the electric circuit (3), wherein the energy source (4) and the electric filter (7) interact in such a way that the power supply device (2) has, at a filter output (9), a voltage source characteristic in a first frequency range and a current source characteristic in a second frequency range, which has a higher frequency than the first frequency range.

10 Claims, 2 Drawing Sheets

US 8,111,049 B2

POWER SUPPLY DEVICE FOR AN ELECTRIC CIRCUIT

Figure 1:
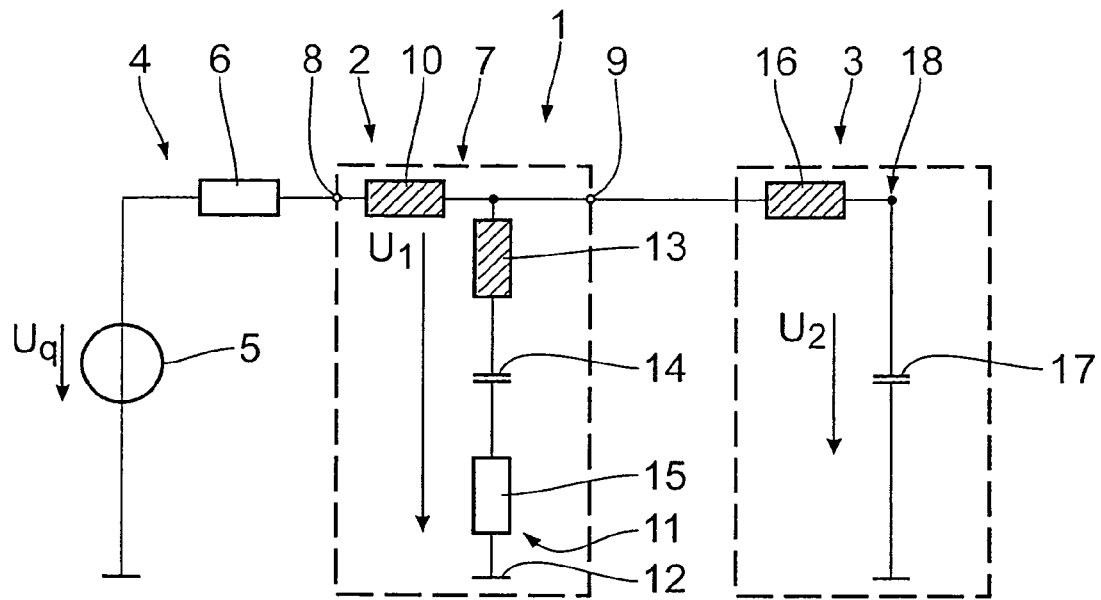

The invention relates to a power supply device for an electric circuit.

Power supply devices for electric circuits are usually embodied as regulated voltage sources. As these voltage sources fulfill their function only up to some 100 kHz, it is known to switch capacitors at an output of the regulated voltage source in parallel manner. By means of the capacitors the bandwidth of regulated voltage sources is extended.

By this bandwidth extension resonant circuits of high quality can be formed, which involve an increased emission of electromagnetic energy. Furthermore, the bandwidth extension leads in particular with fast clocking integrated circuits, as for example with storage components or microprocessors, in the range of the clock frequency as well as their associated harmonics to the common-mode voltages in the ground wire and thus also without resonance effects to an increased emission of electromagnetic energy.

It is, therefore, the object of the invention to further develop a power supply device for an electric circuit such that the electric circuit can be supplied with energy reliably and with low-emission.

This object is achieved according to invention by a power supply device with the features indicated in claim 1. According to invention it was recognized that by the interaction of the energy source and of the at least one electric filter a power supply of the electric circuit is possible such that it is supplied with energy essentially exclusively in a functionally necessary frequency range. In the first frequency range, which corresponds to the functionally necessary frequency range of the electric circuit, the power supply device substantially has a voltage source characteristic at the filter output. This means that the voltage applied at the filter output in the first frequency range is substantially independent from the load. In the second frequency range, which has a higher frequency than the first frequency range the power supply device has at the filter output an energy source characteristic. This means that the filter output in the second frequency range has a high impedance, so that via the power supply device substantially no high-frequency electric circuits can be formed. Thus, the electric circuit is reliably supplied with energy in the functionally necessary first frequency range. Simultaneously, the emission of electromagnetic energy is low, as there is no emission in the first frequency range due to the low frequencies and in the second frequency range due to the low currents and voltages of high frequency. The emission of electromagnetic energy is thus significantly reduced compared with the known power supply devices, which due to the bandwidth extension have a voltage source behavior which is far beyond the functionally necessary range.

An embodiment of the power supply device according to claim 2 ensures in practice a reliable power supply with a simultaneously sufficient low-emission behavior.

A energy source according to claim 3 allows for a simple implementation of the voltage source characteristic in the first frequency range.

An embodiment of the at least one electric filter according to claim 4 is simple and cost-efficient.

An embodiment of the at least one electric filter according to claim 5 allows in simple manner for a decoupling of the energy source from the electric circuit to be supplied in the second frequency range.

In addition to the inductive behavior a decoupling element according to claim 6 has an ohmic behavior in case of higher frequencies. By the increasingly ohmic behavior with higher frequencies the quality of resonant circuits containing the decoupling element drops with an increasing frequency.

An embodiment of the at least one electric filter according to claim 7 allows for an extension of the first frequency range. The resonant frequency and the quality of the series resonant circuit are designed such that it acts in the upper first frequency range as a voltage source. In particular with an embodiment of the energy source as a voltage source the series resonant circuit supplements and extends the functional frequency range of the voltage source.

An inductively acting component according to claim 8 causes the series resonant circuit to have an additional ohmic behavior with higher frequencies, in particular in the second frequency range, so that the quality of the series resonant circuit is drastically reduced. Due to the ferrite material the component has an additional ohmic behavior.

An embodiment of the power supply device according to claim 9 allows for a still more reliable power supply with a simultaneous lower emission.

An electric circuit according to claim 10 makes it possible that the advantages of the power supply device according to the invention comes in useful when being operated with an electric circuit.

Figure 2:
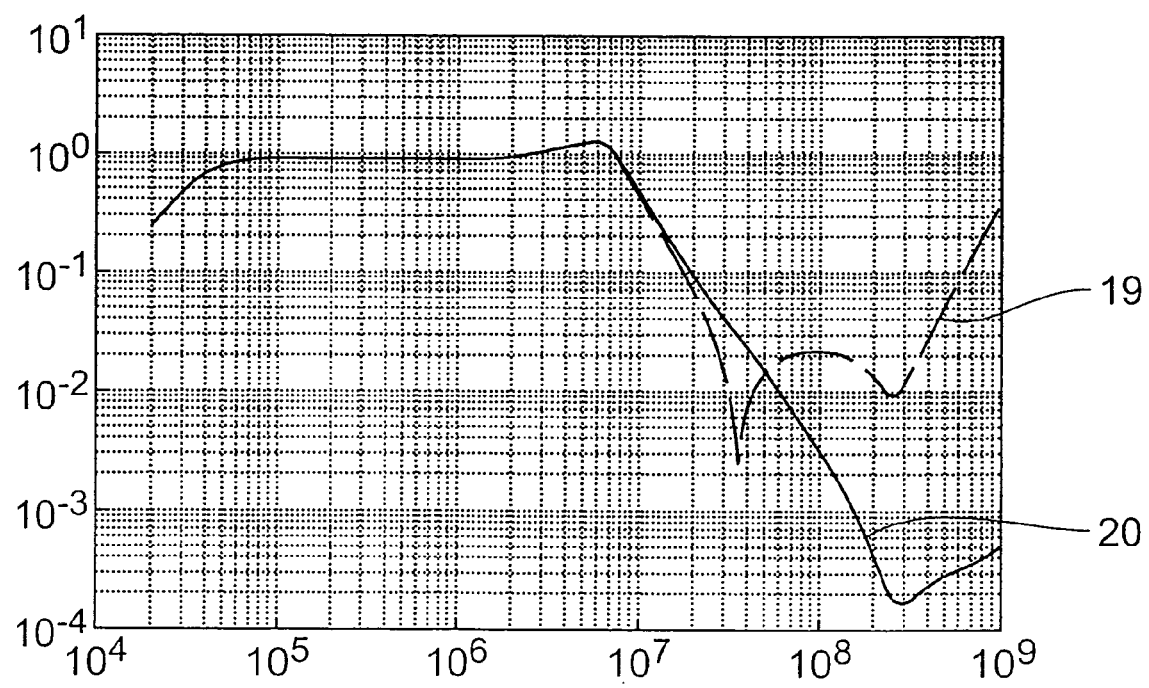
Figure 3:
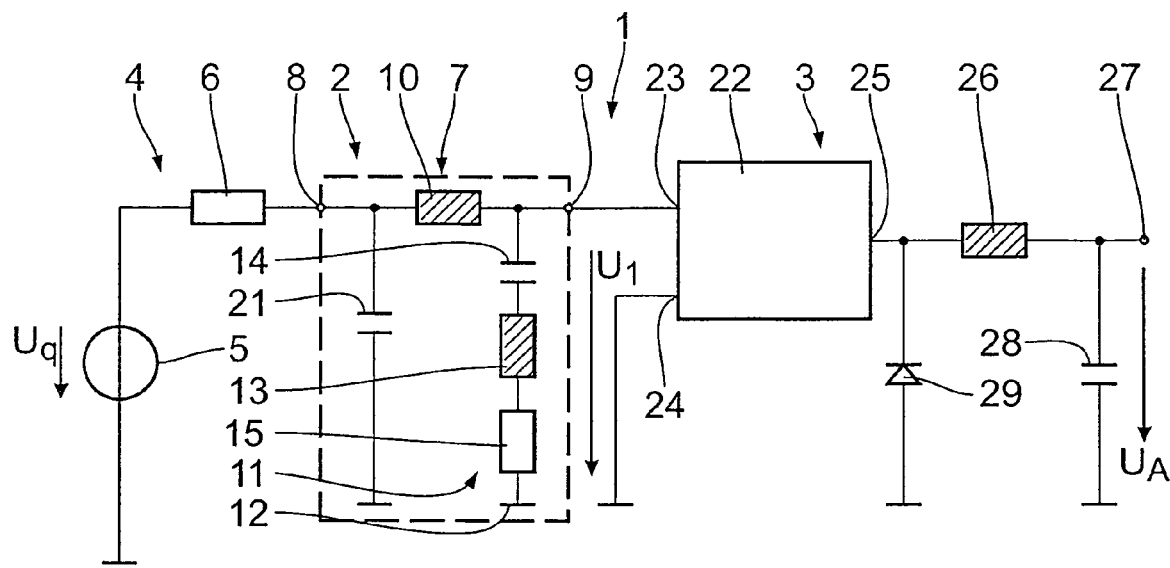
Figure 4:
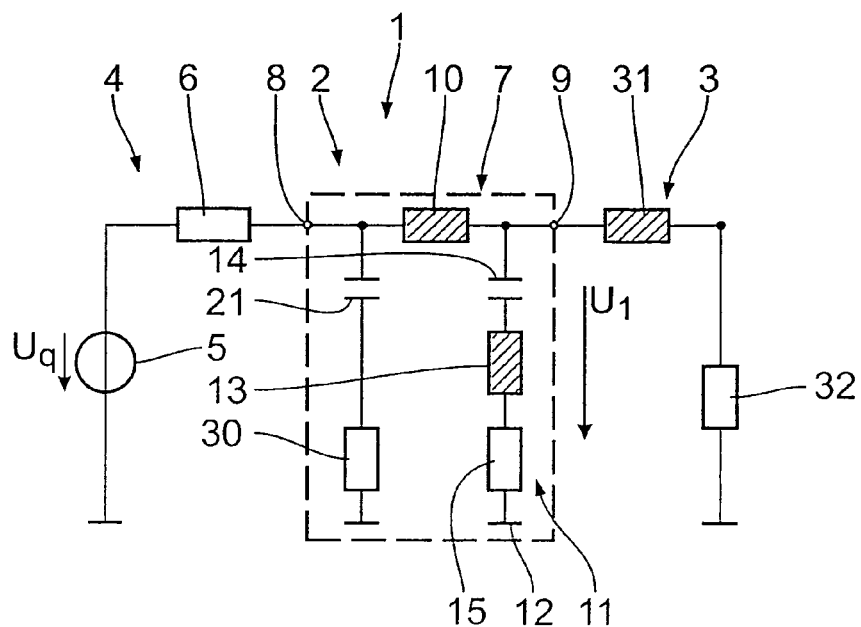

Additional features and details of the invention will become apparent from the description of several examples of embodiment on the basis of the drawing, in which FIG. 1 shows an equivalent circuit diagram of an electric circuit with a power supply device in accordance with a first example of embodiment of the invention, FIG. 2 shows a diagram of the amplitude characteristic of a voltage transmission function of the power supply device according to FIG. 1, FIG. 3 shows an equivalent circuit diagram of an electric circuit with a power supply device according to a second example of embodiment of the invention, and FIG. 4 shows an equivalent circuit diagram of an electric circuit with a power supply device according to a third example of embodiment of the invention.

In the following with reference to FIGS. 1 to 3 a first example of embodiment of the invention is described. An electric circuit 1 comprises a power supply device 2 and an electric circuit 3. The electric circuit 3 is connected to the power supply device 2 to supply energy.

For providing electric energy the power supply device 2 comprises an energy source 4, which is formed as a regulated voltage source. The energy source 4 is referred to in the following as voltage source. In the equivalent circuit diagram in accordance with FIG. 1 the voltage source 4 is shown as a series connection of an ideal voltage source 5 and a complex internal resistance 6. The complex internal resistance 6 has an impedance value $Z_i$. The ideal voltage source 5 generates a load-independent source voltage $U_q$.

For the supply of the electric circuit 3 the power supply device 2 comprises further an electric filter 7. The electric filter 7 is connected at a filter input 8 with the voltage source 4. At a filter output 9 the electric filter 7 is connected with the electric circuit 3, so that the electric filter 7 is arranged between the voltage source 4 and the electric circuit 3. A voltage $U_1$ is applied at the filter output 9. The voltage $U_1$ represents the supply voltage of the electric circuit 3.

The electric filter 7 is formed passively. This means that the electric filter 7 is formed exclusively of passive components. The electric filter 7 comprises an inductively acting decoupling element 10, which is connected between the filter input 8 and the filter output 9. The inductively acting decoupling element 10 is formed as a coil made of ferrite material. Alternatively, the decoupling element 10 can be formed as a ferrite bead. The inductively acting decoupling element 10 serves for decoupling the voltage source 4 from the electric circuit 3 to be supplied and has an inductance value $L_1$.

Furthermore, the electric filter 7 comprises a series resonant circuit 11. The series resonant circuit 11 is connected between the filter output 9 and a circuit ground 12. The series resonant circuit 11 is thus arranged parallel to the electric circuit 3 at the output side of the electric filter 7. The series resonant circuit 11 comprises an inductively acting component 13 and a capacitor 14, which are connected in series. The inductively acting component 13 comprises an inductance value $L_2$. Further, the capacitor 14 comprises a capacitance value $C_2$. The inductively acting component 13 is formed as a coil and consists of a ferrite material. Furthermore, the series resonant circuit 11 comprises an ohmic resistor 15 connected in series to the inductively acting component 13 and the capacitor 14. The ohmic resistor 15 has a resistance value $R_2$. Further, the inductively acting component 13 can be formed as a ferrite bead.

The electric circuit 3 is formed as a clocked integrated circuit and has a clock frequency $f_1$. As a rule the integrated circuit is referred to as IC (Integrated Circuit). In the equivalent circuit diagram in accordance with FIG. 1 a power supply bus of the integrated circuit is shown, being modeled in the equivalent circuit diagram as a series connection of a bus inductance 16 and a bus capacity 17. The bus inductance 16 has an inductance value $L_3$ and the bus capacity 17 a capacitance value $C_3$. Between the bus inductance 16 and the bus capacity 17 a node 18 is formed, a voltage $U_2$ being applied at the node 18.

The voltage source 4 and the electric filter 7 are formed such that the power supply device 2 has at the filter output 9 in a first frequency range $\Delta F_1$ a voltage source characteristic and in a second frequency range $\Delta F_2$ which has a higher frequency than the first frequency range $\Delta F_1$ a current source characteristic. Voltage source characteristic means that the supply voltage $U_1$ is essentially load-independent in the first frequency range $\Delta F_1$, current source characteristic means that the power supply device 2 at the filter output 9 in the second frequency range $\Delta F_2$ has high impedance. Preferably, the voltage source 4 and the electric filter 7 are formed such that the first frequency range $\Delta F_1$ reaches at least up to $\frac{1}{10}$, in particular $\frac{1}{5}$, and in particular $\frac{2}{5}$ of the clock frequency $f_1$ of the electric circuit 3 to be supplied and the second frequency range $\Delta F_2$ starts at least from the clock frequency $f_1$.

A first curve 19 in FIG. 2 shows the amplitude characteristic of a voltage transmission function $U_1/U_q$, wherein along the abscissa a frequency f in Hz and along the ordinate the voltage amplitude ratio $U_1/U_q$ is applied. A second curve 20 shows accordingly the amplitude characteristic of a voltage transmission function $U_2/U_q$.

As can be taken from the first curve 19 in FIG. 2, the first frequency range $\Delta F_1$ reaches until approx. 7 MHz. This means that the power supply device 2 has up to 7 MHz a voltage source characteristic. In a lower first frequency range until approx. 100 kHz the regulated voltage source 4 causes the voltage source characteristic. With an increasing frequency the influence of the decoupling element 10 rises and increasingly decouples the voltage source 4 from the electric circuit 3. In an upper first frequency range of approx. 100 kHz to 7 MHZ the voltage source characteristic is essentially effected by the behavior of the series resonant circuit 11. Starting from the end of the first frequency range $\Delta F_1$ at approx. 7 MHz the attenuation of the decoupling element 10 and of the inductively acting component 13 begins, wherein the attenuation is effected by the ferrite material, which with higher frequencies leads to an additional ohmic behavior of the decoupling element 10 and of the inductively acting component 13. Thus, the power supply device 2 has in the second frequency range $\Delta F_2$ from approx. 20 MHz to 1 GHz an energy source characteristic. The power supply device 2 thus ensures on the one hand a reliable power supply of the electric circuit 3 and guarantees on the other hand a small emission of electromagnetic energy.

In the following with reference to FIG. 3 a second example of embodiment of the invention is described. The electric filter 7 comprises in addition to the decoupling element 10 and the series resonant circuit 11 a smoothing capacitor 21, which is connected between the filter input 8 and the circuit ground 12 and thus is arranged parallel to the voltage source 4. The smoothing capacitor 21 has a capacitance value $C_1$. The smoothing capacitor 21 serves for the stabilization of the voltage applied at the filter input 8. The electric circuit 3 comprises a switching regulator 22, which is formed for example as a buck converter or a boost converter. A first input 23 of the switching regulator 22 is connected with the filter output 9. A second output 24 of the switching regulator 22 is connected with the circuit ground 12. Furthermore, the switching regulator 22 comprises an output 25, which is connected via a storage throttle 26 with a circuit output 27. The output voltage $U_A$ is applied at the circuit output 27. The electric circuit 3 comprises at the output side a further smoothing capacitor 28, which is connected with the circuit output 27 and the circuit ground 12. The storage throttle 26 has an inductance value $L_A$ and the smoothing capacitor 28 a capacitance value $C_A$. The inductance value $L_A$ is for example 68 pH and the capacitance value $C_A$ is 100 µF. At the output 25 of the switching regulator 22 a free-wheeling diode 29 is arranged, which is connected between the output 25 and the circuit ground 12. The free-wheeling diode 29 has a flow capacity, which causes a capacitive behavior of the free-wheeling diode 29. The flow capacity lies within the range of approx. 1 nF. The flow capacity and a power inductance not shown form a parallel resonant circuit, which closes via the smoothing capacitor 21. Without the decoupling element 10 and the series resonant circuit 11 the resonant frequency of this parallel resonant circuit would be approx. 100 MHz.

By means of the inductively acting decoupling element 10 and the inductively acting component 13 the resonant frequency is pushed into the functional frequency range of the switching regulator 22, so that the switching regulator 22 actively reduces the quality of the parallel resonant circuit so far, that the parallel resonant circuit does no longer exist. The inductively acting decoupling element 10 decouples the switching regulator 22 from the voltage source 4 and forms together with the series resonant circuit 11 an input filter for a load connected to the circuit output 27. The resonant frequency and the quality of the series resonant circuit 11 is designed such that it has a voltage source characteristic for the functional range of the switching regulator 22, which essentially corresponds to the upper first frequency range. Due to the fact that the inductively acting decoupling element 10 and the inductively acting component 13 are made of a ferrite material, an additional attenuation and a broad-band reduction of the quality is achieved by the losses in the ferrite material, so that the power supply device 2 has an energy source characteristic in the second frequency range $\Delta F_2$. The parallel resonant circuit is attenuated by the switching regulator 22 and the ferrite material so far that the electric circuit 1 is no longer oscillatory. Apart from that the operating mode of the power supply device 2 corresponds to the operating mode described in the first example of embodiment.

In the following with reference to FIG. 4 a third example of embodiment of the invention is described. The electric filter 7 comprises in addition to the smoothing capacitor 21 an ohmic resistor 30 connected in series thereto. The ohmic resistor 30 has a resistance value $R_1$. The electric circuit 3 is shown in the equivalent circuit diagram in accordance with FIG. 4 as a series connection of a power inductance 31 and a complex circuit load 32. The power inductance 31 has an inductance value $L_L$ and the complex circuit load 32 has an impedance value $Z_L$. The ohmic resistor 30 serves for the limitation of resonant currents between the smoothing capacitor 21 and the complex circuit load 32, which flow via the decoupling element 10 and the power inductance 31. The complex internal resistance 6 of the voltage source 4 limits the frequency range of the voltage source 4. By means of the resonance of the series resonant circuit 11 the functional frequency range of the voltage source 4 is extended and is specifically adapted to the load requirements, so that the power supply device 2 has a voltage source characteristic in the first frequency range $\Delta F_1$, which essentially corresponds to a functional frequency range of the electric circuit 3. With increasing frequency the inductively acting decoupling element 10 increasingly more and more decouples the voltage source 4 and the smoothing capacitor 21 from the electric circuit 3. In addition, the decoupling element 10 and the inductively acting component 13, which consist of a ferrite material, have with rising frequency an increasing ohmic behavior. Thus, the power supply device 2 has high impedance in the second frequency range $\Delta F_2$ at the filter output 9, so that a current source characteristic is formed. By the high losses in the ferrite material no high frequency resonances can arise. In the first frequency range $\Delta F_1$ the quality of the parallel resonant circuits formed in the electric circuit 1 can be adjusted via the ohmic resistors 15, 30.

Due to the fact that the power supply device 2 has a voltage source characteristic in the first frequency range $\Delta F_1$, which essentially corresponds to the functional frequency range of the electric circuit 3 to be supplied, and has in a second frequency range $\Delta F_2$ a current source characteristic, the electric circuit 3 is reliably supplied with energy exclusively in the functionally required frequency range. In the first frequency range the frequencies are such low that no considerable emission of electromagnetic energy is effected. In the higher-frequency second frequency range $\Delta F_2$ the power supply device 2 has high impedance, so that via the circuit ground 12 only low currents of high frequency can flow and no considerable high-frequency voltage drops. The emission of electromagnetic energy is thus also low. In further example of embodiments the electric filters 7 described in the preceding embodiments can be connected cascade-like one after the other. By a cascade-like serial connection of the electric filters 7 an improved voltage source and current source characteristic is achieved.

The invention claimed is:

1. A power supply device for an electric circuit,
    a. with an energy source (4) for providing electric energy, and
    b. with at least one electric filter (7) for supplying the electric circuit (3) with electric energy, wherein
    c. the energy source (4) and the at least one electric filter (7) interact in such a way that the power supply device (2) at a filter output (9)
        i. has a voltage source characteristic in a first frequency range ($\Delta F_1$), and
        ii. has a current source characteristic in a second frequency range ($\Delta F_2$), which has a higher frequency than the first frequency range ($\Delta F_1$).

2. The power supply device according to claim 1, characterized in that the energy source (4) and the at least one electric filter (7) are formed such that the first frequency range ($\Delta F_1$) reaches at least up to a tenth of a clock frequency ($f_1$) of the electric circuit (3) to be supplied and that the second frequency range ($\Delta F_2$) starts at least from the clock frequency ($f_1$).

3. The power supply device according to claim 1, characterized in that the energy source (4) is a voltage source.

4. The power supply device according to claim 1, characterized in that that the at least one electric filter (7) is a passive filter.

5. The power supply device according to claim 1, characterized in that that the at least one electric filter (7) comprises an inductively acting decoupling element (10) adapted to decouple the energy source (4) from the electric circuit (3) that is to be supplied with electric energy.

6. The power supply device according to claim 5, characterized in that the inductively acting decoupling element (10) consists of a ferrite material.

7. The power supply device according to claim 1, characterized in that the at least one electric filter (7) comprises a series resonant circuit (11), which is arranged parallel to the energy source (4) at an output side of the at least one electric filter (7).

8. The power supply device according to claim 7, characterized in that the series resonant circuit (11) comprises an inductively acting component (13) that consists of a ferrite material.

9. The power supply device according to claim 1, characterized in that the at least one electric filter comprises several electric filters (7) that are cascade-connected in series.

10. An electric circuit arrangement comprising
    a. a power supply device (2) according to claim 1, and
    b. an electric circuit (3) to be supplied with energy and having a clock frequency ($f_1$).

* * * * *